(No Model.)  9 Sheets—Sheet 1.

E. D. SHEPARDSON.
FEED WATER REGULATOR.

No. 308,387. Patented Nov. 25, 1884.

Witnesses.
A. O. Behel
S. A. D. Behel

Inventor.
Edward D. Shepardson
Per Jacob Behel
Atty.

(No Model.) 9 Sheets—Sheet 4.
E. D. SHEPARDSON.
FEED WATER REGULATOR.
No. 308,387. Patented Nov. 25, 1884.

(No Model.) 9 Sheets—Sheet 5.

E. D. SHEPARDSON.
FEED WATER REGULATOR.

No. 308,387. Patented Nov. 25, 1884.

Witnesses.
Inventor.
Edward D. Shepardson.
Per Jacob Behel.
Atty.

(No Model.)  9 Sheets—Sheet 6.
E. D. SHEPARDSON.
FEED WATER REGULATOR.
No. 308,387.  Patented Nov. 25, 1884.
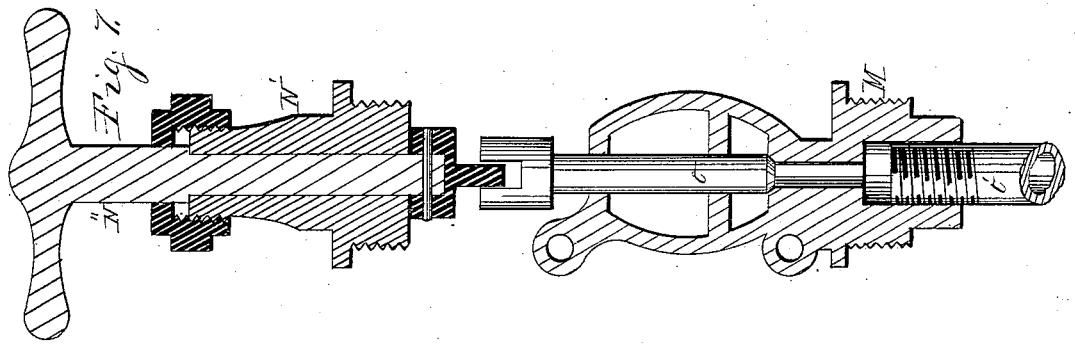
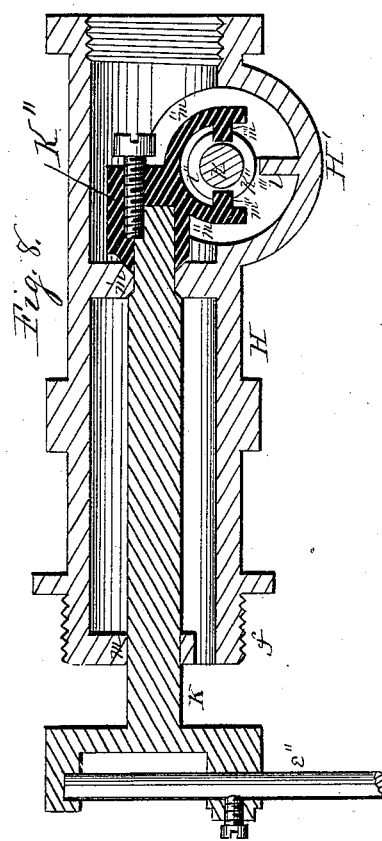
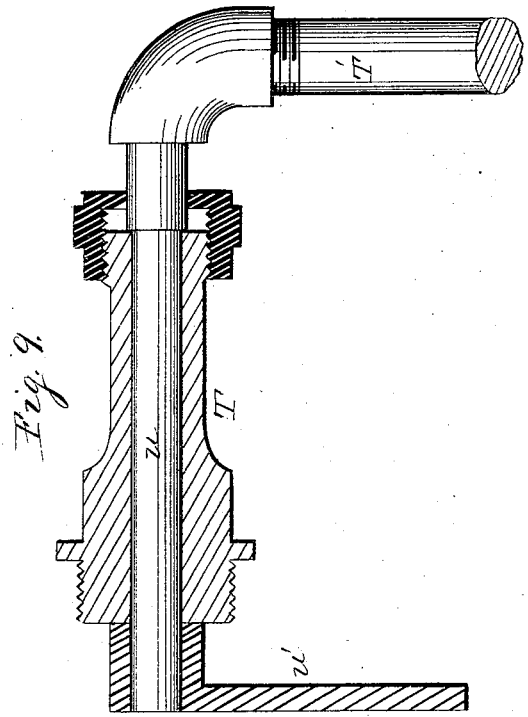
Witnesses.
A. O. Behel
S. A. D. Behel
Inventor
Edward D. Shepardson
Per Jacob Behel
Atty.

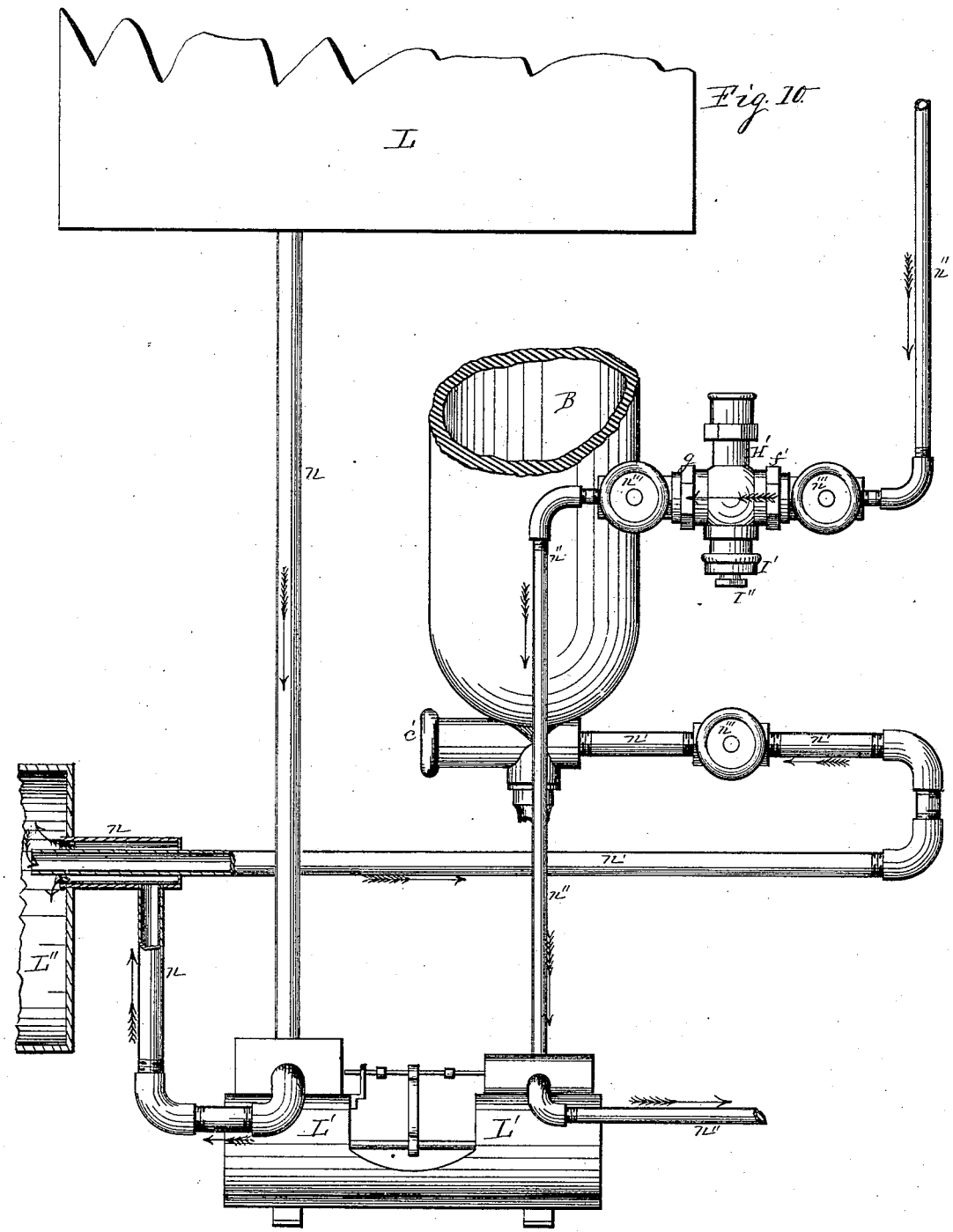

(No Model.)
E. D. SHEPARDSON.
FEED WATER REGULATOR.
No. 308,387. Patented Nov. 25, 1884.
9 Sheets—Sheet 8.
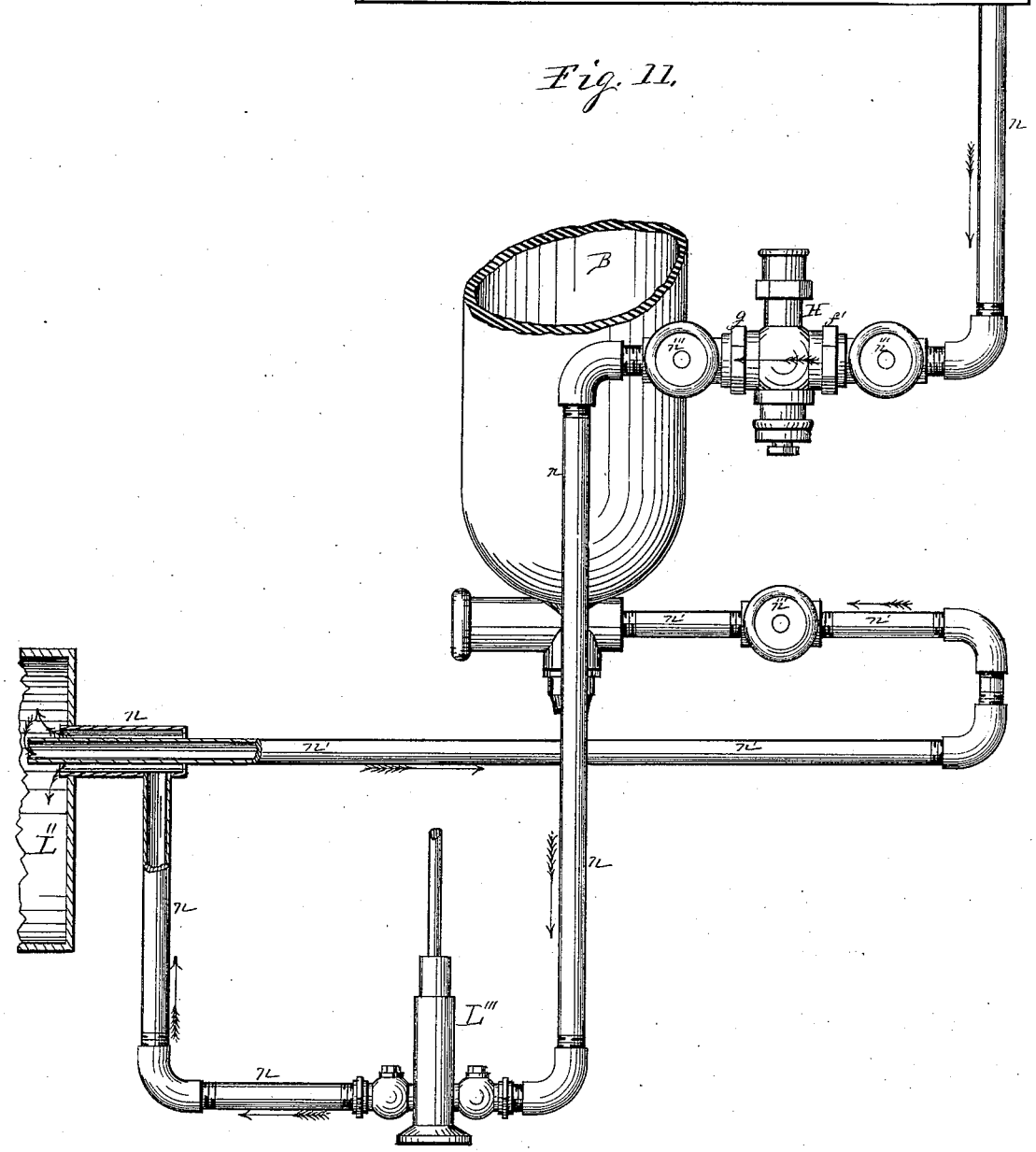

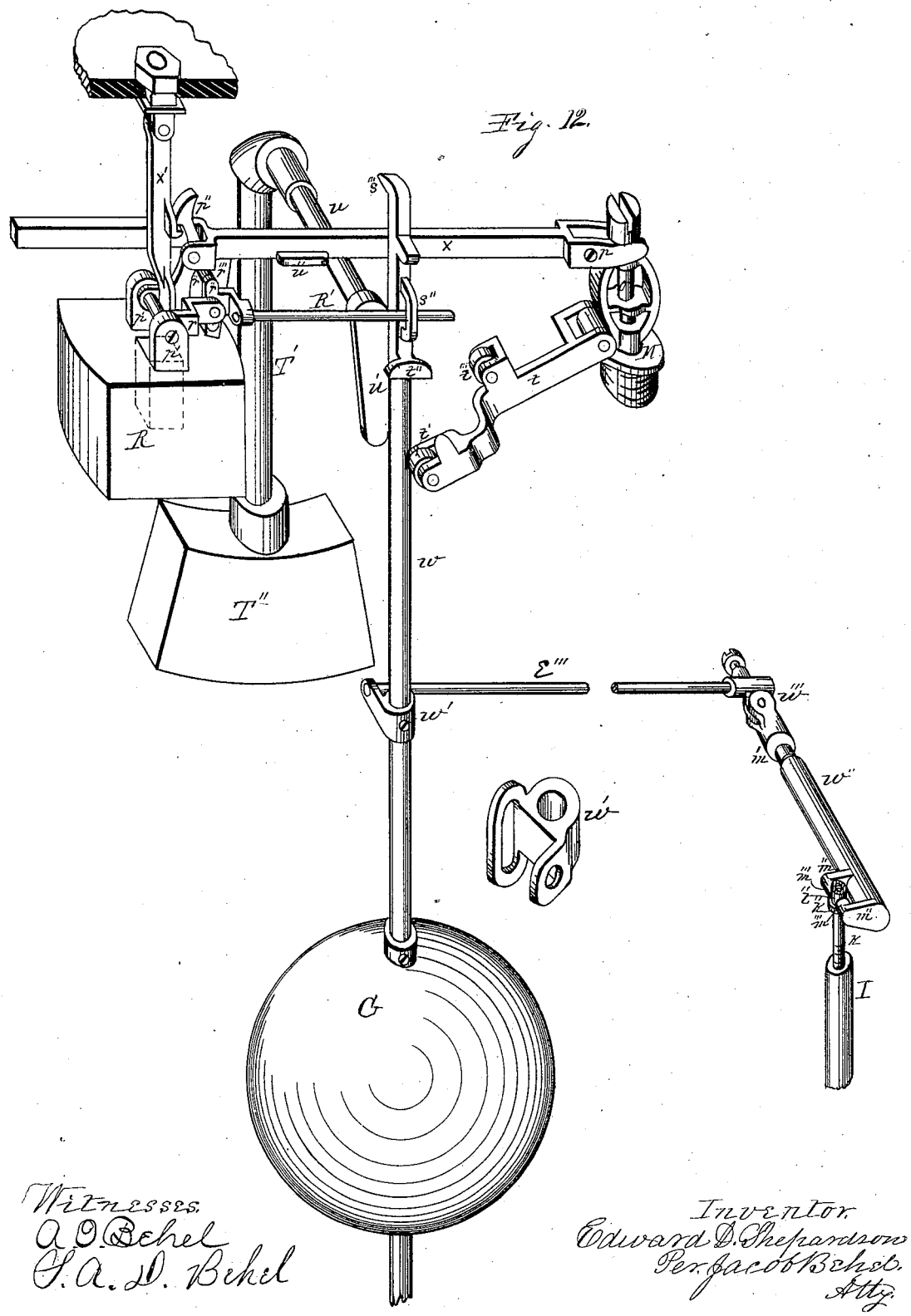

United States Patent Office.

EDWARD D. SHEPARDSON, OF BELLEVUE, OHIO, ASSIGNOR OF ONE-HALF TO JOSIAH S. BROWN, OF RED OAK, IOWA.

FEED-WATER REGULATOR.

SPECIFICATION forming part of Letters Patent No. 308,387, dated November 25, 1884.

Application filed September 10, 1883. (No model.)

*To all whom it may concern:*

Be it known that I, EDWARD D. SHEPARDSON, a citizen of the United States, residing in Bellevue, in the county of Huron and State of Ohio, have invented new and useful Improvements in Feed-Water Regulators for Steam-Boilers, of which the following is a specification.

My invention relates to that class of feed-water regulators in which the action of the regulator is controlled by the rise and fall of the water in the boiler, and is capable of use in connection with steam or plunger pumps employed to force the water into the boiler; and it consists in a valve of suitable construction adapted to the purpose, having a float connection with the water in the boiler, the rise and fall of which controls the effective operation of the pump or the flow of the water into the boiler or steam to the pump; in a high or low water steam-whistle alarm having suitable mechanism connecting it with the float in the regulator. These and other improvements to be hereinafter described constitute the subject-matter of this specification.

Figure 1:
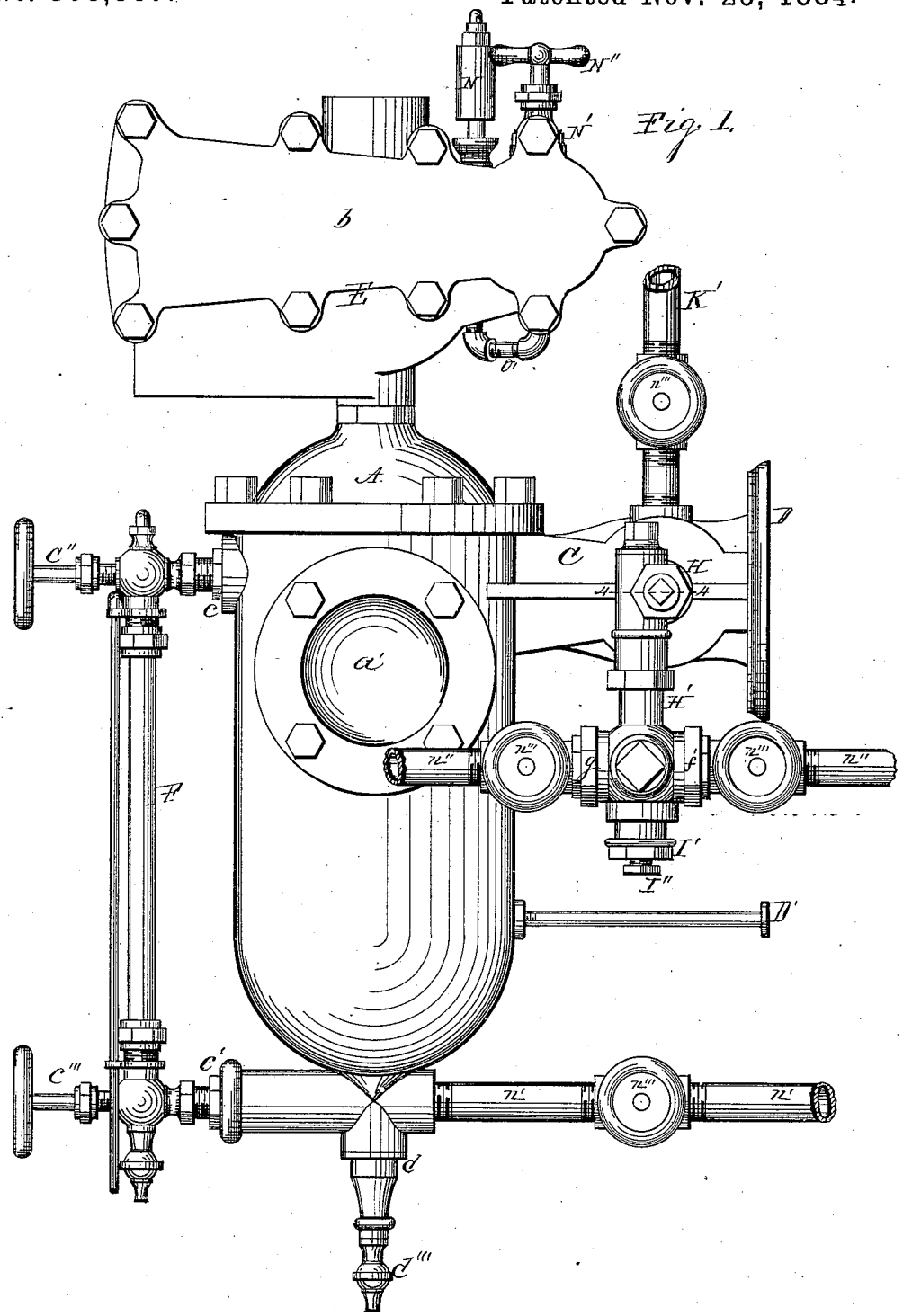
Figure 2:
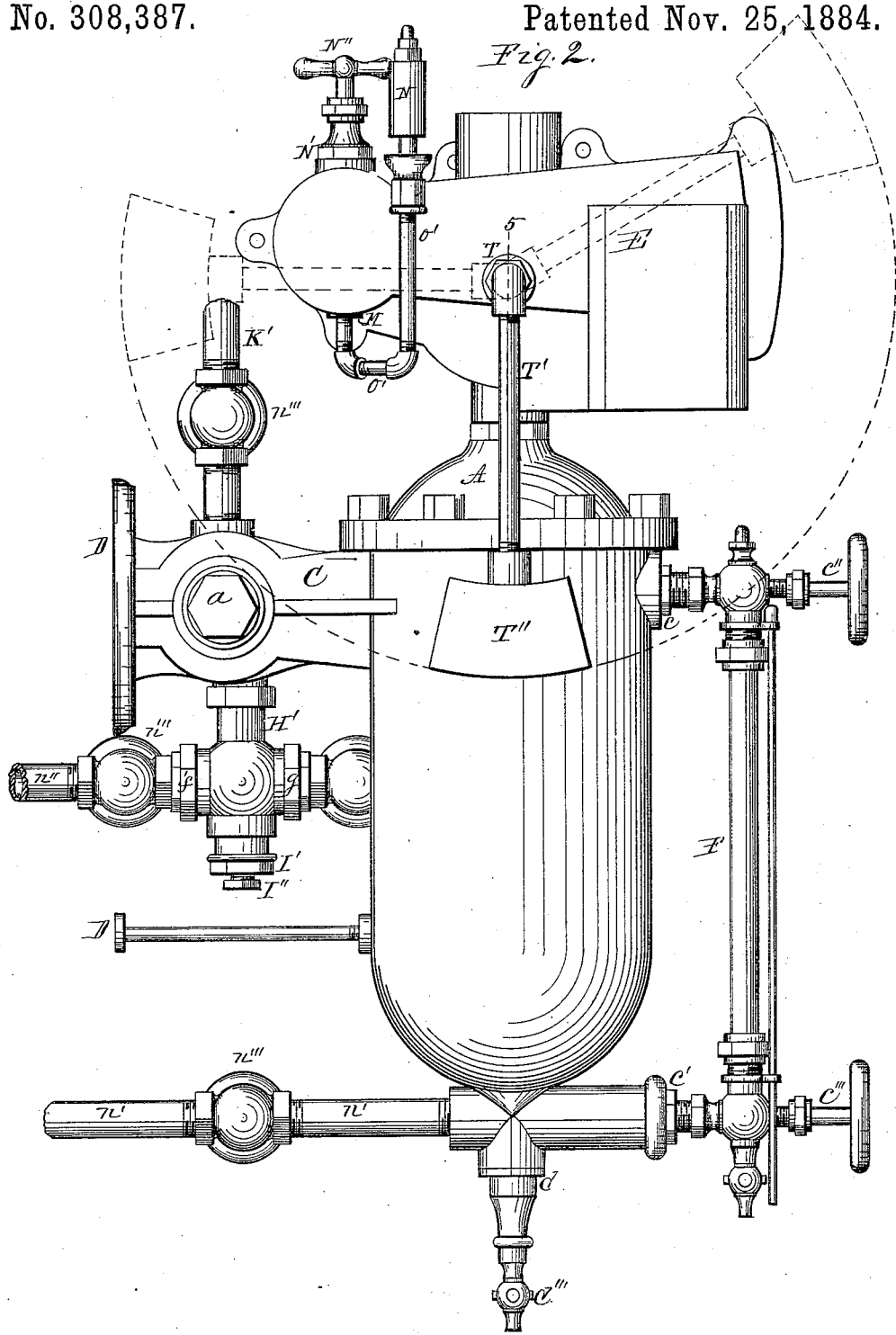
Figure 3:
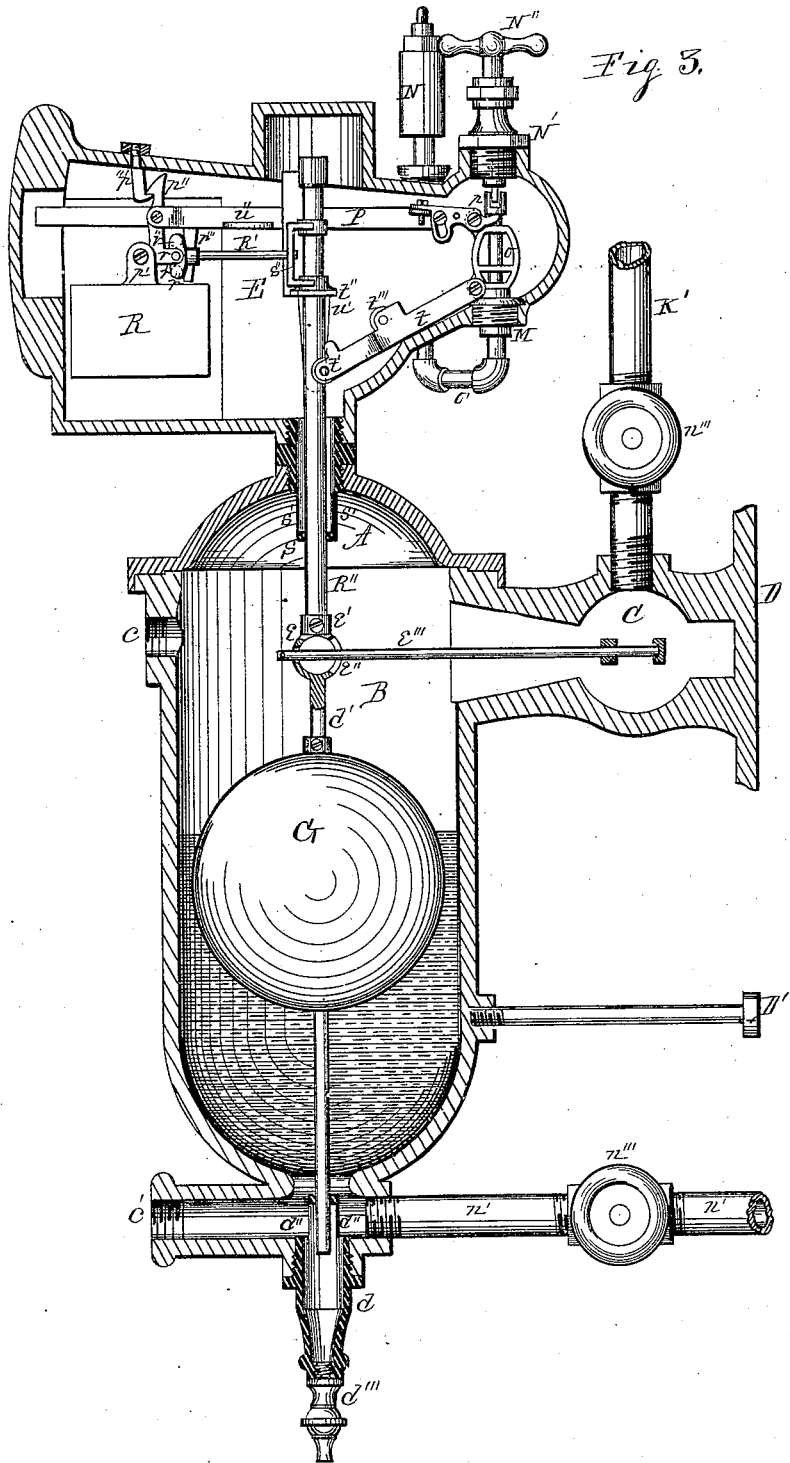
Figure 4:
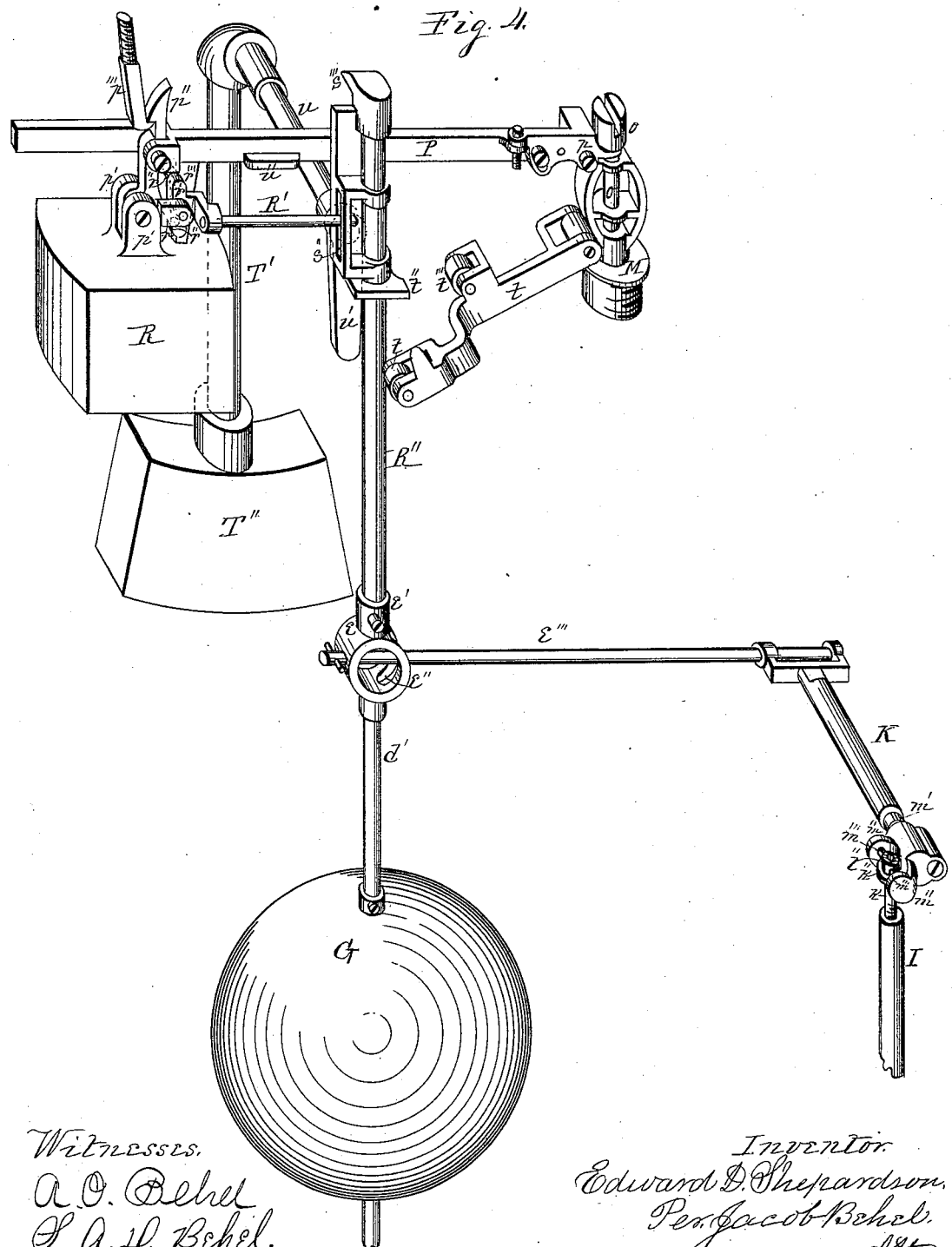
Figure 5:
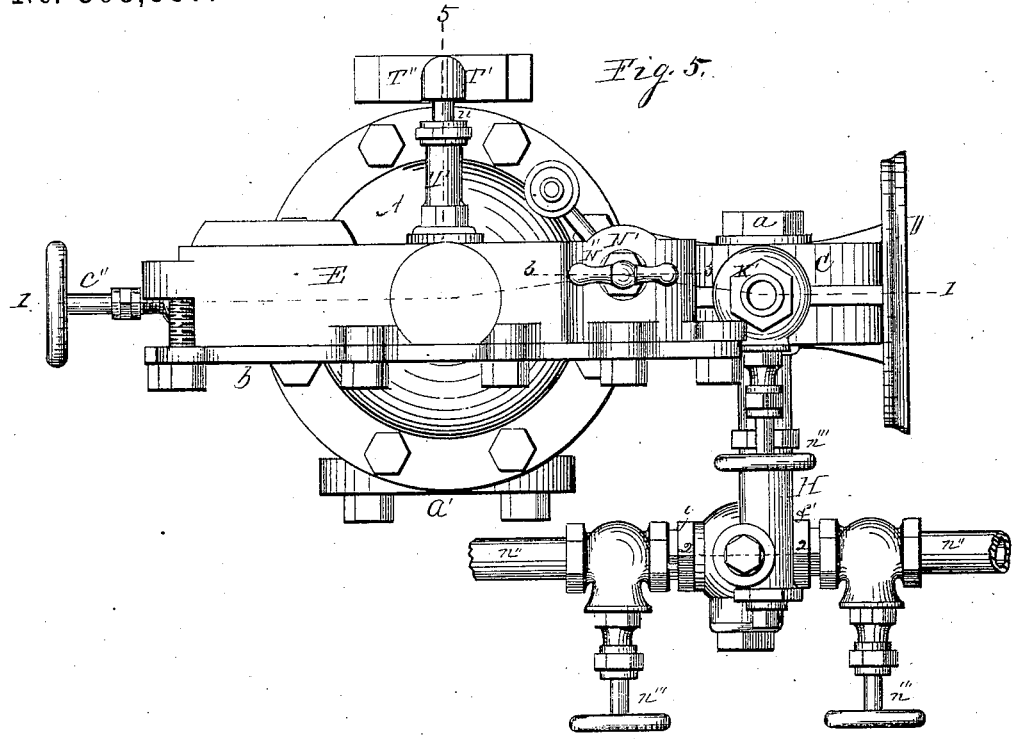
Figure 6:
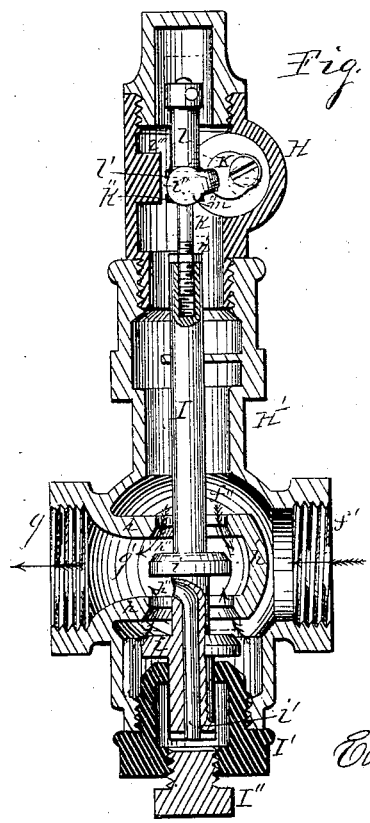

In the accompanying drawings, Figure 1 is a front side elevation of a feed-water regulator embodying my invention. Fig. 2 is a rear side elevation. Fig. 3 is a central vertical section on dotted line 1, Fig. 5. Fig. 4 is a skeleton isometrical representation of the working parts. Fig. 5 is a plan view. Fig. 6 is a vertical central section of the valve on dotted line 2, Fig. 5. Fig. 7 is a vertical section of the alarm-valve on dotted line 3, Fig. 5. Fig. 8 is a horizontal central section of the oscillating valve-lifting lever on dotted line 4, Fig. 1. Fig. 9 is a vertical central section of the weighted test-lever on dotted lines 5, Figs. 2 and 5. Fig. 10 is an elevation of the water-pipe connections with the water-supply tank, steam-pump, and steam-pipe connections with the steam-chamber of the regulator-valve and steam-pump. Fig. 11 is an elevation of the water-pipe connections with the water-supply tank, valve, plunger-pump, mud-drum, and with the mud-drum and regulator. Fig. 12 represents an isometrical view of modifications of some of the working parts of my improved regulator.

The float-cylinder of my improved regulator in this instance is produced in several parts suitably connected to obtain a practical construction adapted to contain the working parts of the regulator and the necessary pipe and check valve connections in a practical form. This float-cylinder is produced in suitable outline form of proper dimensions, and provided with a removable head, A, fixed in place and made removable by means of clamping-bolts passing through annular flanges formed on the parts. It is formed with a float-chamber, B, to receive a suitable float, and is also provided with a hollow arm, C, projecting laterally from its upper portion, having its outer end provided with a disk-flange, D, forming a foot by which the regulator may be fixed to a vertical support, and, if desired, an additional screw-rod support, D′, may be employed. This hollow arm on its rear side and outer end portions is provided with a hand-hole fitted with a removable screw-plug, $a$, and the float-cylinder is also provided with a hand-hole fitted with a cap, $a'$, held in place and made removable by means of clamping or holding screw-bolts. On the upper end of this float-cylinder is mounted a steam-chest, E, centrally supported on the cylinder, having its lengthwise axis in this instance in the same vertical plane with the lengthwise axis of the lateral projecting arm C. This steam-chest E is provided with a leaf or side, $b$, held in place on the side of the chest, and made removable by means of clamping or holding screw-bolts. The float-cylinder is provided with suitable connections, $c$ and $c'$, to which the glass-tube water-gage F, with its check-valves $c''$ and $c'''$, is attached in the usual manner. The lower end of the float-cylinder is provided with a tubular screw-plug guide-bearing, $d$, to receive the lower end of the float-stem $d'$ in a free manner. This tubular screw-plug guide is provided with side openings, $d''$, to admit the water and permit it to pass through the tube laterally. This tubular screw-plug bearing is provided at its lower end with a removable screw-plug, $d'''$, which, when removed, will permit the sediment or settlings to escape.

At G is represented a float of any suitable construction and of proper dimensions, mounted on a float-stem, $d'$, within the float-chamber, and is made vertically adjustable thereon by means of a set-screw in the collar on its upper end. This float-stem in this instance is composed of a lower and an upper section, having the upper end of its lower section, $d'$, provided with a T-formed tubular connection, e, having its central uprising portion, e', adapted to receive the lower end of the upper section of the float-stem, and is fitted with a set-screw to connect the parts. The horizontal portion of this tubular bearing e is centrally slotted vertically at e'' on one side, and its opposite side is provided with a hole of suitable conformation to receive a lever, e''', in such a manner as to permit it to vibrate freely therein.

At H is represented the horizontal portion, and at H' the vertical portion, of the valve-tube. The horizontal portion H of this tube has its end at f screw-jointed into the side of the outer portion of the hollow arm C, from which it projects laterally at right angles. The portion H of this valve-tube, which constitutes the valve proper, has an eccentric or side connection with the horizontal portion H near its outer end, from which it depends in a vertical position. This vertical portion H' near its lower end is of globe form, provided at one side with an induction-pipe connection, f', communicating with the outer chamber, f''', of the globe; and its opposite side is provided with an exit-pipe connection, g, communicating with the inner chamber, g', of the globe. The inner chamber, g', is separated from the outer chamber, f''', by the transverse walls h and the inner spherical wall h', of which the transverse walls h are provided with valve-seats h'', concentric with the axial center of the tube.

At I is represented the main portion of a valve-stem having its lower portion fitted with valves i to engage the valve-seats h''. These valves, their valve-seats, and the opening in the lower end of the valve-tube are relatively of such size as to permit the valves to be passed into position in the tube through its lower end. The lower end of the valve-tube is fitted with a screw-plug, I', provided with an axial opening adapted to receive the lower end portion of the valve-stem in a manner known in mechanics as a "loose fit," and the center portion of this screw-plug is chambered to prevent binding or cramping of the stem in its bearing in the plug. The lower end of this tubular screw-plug is provided with a removable screw-plug, I'', which, when removed, will permit the insertion of a screw-driver to enter the slot in the lower end of the valve-stem to rotate the valves to grind them to their seats. The lower end portion of the valve-stem I is provided with an axial opening, i', which opens through the side of the stem between the valves i, formed thereon, and this opening communicates with the inner or exit chamber, g', of the globe, and its end opening communicates with the annular chamber of the screw-plug I'. These connections are such that when the regulator is used in connection with a plunger-pump this axial opening i'' will permit the water to pass freely to and from the chamber in the tubular screw-plug I', and permit the valve-stem to move freely in its guide-bearing in the tubular screw-plug, and when the regulator is used in connection with a steam-pump this axial opening i' will permit the free passage of the steam in the same manner, and in every such or similar application it will be seen that the pressure in the inner or exit chamber, g', of the globe, in the annular chamber of the screw-plug I', and upon the valves will be uniform and balanced under any pressure, and any escape from the induction side of the valve or chamber into the exit-chamber of the globe or into the annular chamber of the screw-plug will not disturb the equilibrium. In this construction the relative areas of the induction side of the upper valve, including its stem, and the area of the induction side of the lower valve, minus the area of its stem, are substantially equal, from which, in connection with balanced exit sides of the valve, it will be seen that my improved valve is practically a balanced valve under all pressures. The upper end portion of the valve-stem consists of a rod-like portion, k, having an adjustable screw-connection with the main portion of the valve-stem I, for the purpose of properly adjusting the valve to its seat, and it is provided with a lock-nut, k', to fix the parts when adjusted.

At l is represented a sleeve having its lower end provided with collars or annular projecting rings l' and k'', forming an annular groove between the annular rings l' and k''. This sleeve is fixed to the rod-like portion k in a removable manner by means of a set-screw or a transverse pin passed through the parts.

At l''' is represented a vertical rib-like portion projecting radially from the inner surface of the vertical portion H' of the valve-tube opposite the tube of the horizontal portion H, and is designed as a guide to the vertical movements of the valve to hold it in position with the rock-shaft in the tube H.

At K is represented a rock-shaft supported in the horizontal portion H of the valve-tube in bearings m and m', one of which, as at m, projects into the tube from one side thereof in such a manner as to leave an opening within the tube past the projecting bearing, and the other, as at m', is of half-V form, beveled on both sides. The outer end portion of the rock-shaft K is reduced, forming an inclined or beveled shoulder to engage the inclined bearing m', and the reduced outer end portion of the rock-shaft K is provided with a tubular collar, K'', fitted thereon, having its inner end beveled to engage the beveled outer face of the bearing m', and is held in position on the shaft by means of a suitable holding-screw, producing a valve-formed bearing, in such a manner that pressure on either end of the shaft will produce a close-fitting joint to prevent the escape of steam or water and permit the shaft to oscillate in its bearings. The tubular collar K'' is provided with lever-arms m'', projecting laterally from its side in such a manner as to span the upper rod portion of the valve-stem at the point of its annular groove. These lateral projecting arms are provided on their inner faces with projecting stud-pins $m'''$, which enter the annular groove in the valve-stem in such a manner that the oscillatory movements of the shaft K will impart a vertical movement to the valve-stem to open and close the valves. The inner end of the rock-shaft K is fitted to receive the outer end of the lever $e'''$, which is fixed therein by means of a set-screw or otherwise in such a manner that the vertical movements of the end of the lever connected with the float-stem will impart an oscillatory movement to the rock-shaft K.

At $K'$ is represented a pipe employed to connect the regulator with the steam-boiler or other parts of the steam-supply, and in this instance the pipe $K'$ connects with the lateral hollow arm C of the regulator as a convenient point of attachment.

The above-described portion of my improved regulator is capable of use in connection with either a steam or plunger pump employed to supply the boiler with water. When employed in connection with a steam-pump, a system of piping and check-valves connecting the parts and capable of use for the purposes is represented at Fig. 10, in which L represents a portion of a water-supply tank, $L'$ a steam-pump, and $L''$ a portion in section of the mud-drum of a steam-boiler.

At $n$ is represented a pipe which connects the water-tank with the pump and the pump with the mud-drum, and through which the water passes from the tank to the mud-drum or boiler in the direction indicated by the arrows. The end portion of this pipe which connects with the mud-drum is enlarged, for a purpose to be described.

At $n'$ is represented a pipe employed to connect the lower end of the float-cylinder with the mud-drum, and through which the water passes from the boiler to the float-cylinder in the direction indicated by the arrows. The end portion of this pipe $n'$, which connects with the mud-drum, is supported in the axial center of the enlarged portion of the pipe $n$, and its free end extends into the mud-drum beyond the end of the pipe in which it is supported in such a manner that the flow of water into the mud-drum will pass the open end of the pipe leading to the float-cylinder, which action will operate to prevent clogging its open end.

At $n''$ is represented a pipe employed to connect the steam-chamber of the boiler or other steam-supply with the steam-pump in such a manner that the steam on its passage to the pump in the direction indicated by the arrows shall pass through the valve in the vertical portion $H'$ of the valve-tube, thence to the pump, from which it escapes through the exhaust portion of the pipe $n''$. These several pipes are provided at $n'''$ with suitable check-valves, which will be found convenient in examining the parts, cleaning, repairing, or substituting other parts.

From the foregoing it will be seen that when the water sinks or falls in the boiler the float will sink in the float-cylinder, which will operate to open the valve by means of its lever and rock-shaft connection therewith, and the opening of the valve will permit the steam to flow to the pump, which will cause it to operate and force water from the tank into the boiler. This action will cause the water to rise in the boiler and also in the float-cylinder by reason of its pipe-connection therewith, and will cause the float to rise with the rise of the water, which will operate the valve to check the flow of steam and retard the action of the pump, and consequently the flow of water from the tank into the boiler.

My improved regulator is also capable of use in connection with a plunger-pump employed to supply the boiler with water; and a system of piping and check-valves capable of use in this connection is represented in Fig. 11. In this Fig. 11 the parts in common with the employment of the regulator in connection with the steam-pump, as in Fig. 10, are designated by the same letters of reference.

In this application of the regulator the pipe $n$ from the water-tank connects with the valve in the vertical portion $H'$ of the valve-tube, and thence to the plunger-pump $L'''$ and to the mud-drum. The portion of the pipe $n$ connecting the plunger-pump $L'''$ with the mud-drum, the pipe $n'$ connecting the float-cylinder with the mud-drum, and the check-valves of this system are substantially the same as hereinbefore described, and shown in Fig. 10. In this application of the regulator, as in its application with the steam-pump, the rise and fall of the water in the boiler will operate the valve to admit the water from the tank to the boiler or exclude it therefrom.

From the foregoing it will be seen that my improved regulator is automatic in its operations when employed in connection with either a steam or plunger pump.

At M is represented a screw-plug tubular valve-seat having its upper end portion produced in yoke form, which furnishes guide-bearings to the valve-stem.

At $o$ is represented the valve having its stem portion supported to move endwise freely in guide-bearings in the yoke portion of the valve-seat plug, and its lower end produced in valve form to engage the valve-seat in the tubular screw-plug. This tubular screw-plug and its valve therein are fixed in the rear end of the under plate portion of the steam-chest E, and its depending end receives the steam-pipe $o'$, which connects with a steam alarm-whistle, N, which is of the ordinary construction of such parts.

At $N'$ is represented a tubular plug having a screw-joint connection with the upper plate of the steam-chest E, and in such position thereon that its axis shall be in the same vertical line with the axis of the valve to the steam-whistle.

At $N''$ is represented a turn-key supported to revolve in the axial center of the tubular plug, and is made steam-tight by a stuffing-box connection with the tubular plug at its upper end. The lower end of this turn-key is fitted to engage the upper head end portion of the valve in such a manner that the valve may be made to rotate by means of the turn-key, for the purpose of grinding it to its seat and to keep it loose in its bearings; but this connection of the turn-key with the valve-stem head is such as to permit of a limited free endwise movement of the valve-stem.

At P is represented a lever of bar form having its fulcrum-support at $p$ in the upper portion of the yoke of the valve-seat plug in such position that the free forked end of the short arm of the lever shall engage the under face of the head portion of the valve-stem, and its long arm extending horizontally forward through the steam-chest in such a manner that a depression of its free end will operate to lift the valve from its seat. In this instance this lever P is composed of two parts having its short arm pivot-jointed to the long arm and made adjustable, and fixed in position when adjusted by means of adjusting and holding or clamping screws, all of which is clearly shown in the drawings in Figs. 3 and 4; but instead of this two-part lever a single-piece lever may be employed, omitting the adjustment.

At R is represented a weight of suitable dimensions, having its upper surface provided with uprising ears $p'$, to which is pivoted a catch-hook, $p''$. This catch-hook is pivoted to the valve-lifting lever P toward its free end, preferably, in such a manner that its catch-hook shall be above the lever in position to engage a detent-hook, $p'''$, suitably supported within the steam-chest in such position that the catch-hook $p''$ shall engage it when the lever, with the weight attached, is raised to a position to free it from contact with the head of the valve-stem after the valve has engaged the valve-seat. The lower end portion of this catch-hook $p''$ is provided with lateral projecting arms $r$, having the transverse bar $r'$ of the trip-lever R' centrally pivoted to their outer ends. From the outer ends and rear side of this transverse bar $r'$ project tappet stud-pins $r''$ in position to engage the edge face of an arm, $r'''$, depending from the lever P in such a manner that an up or down movement of the free end of the trip-lever R' sufficiently continued will operate to disengage the catch-hook from the detent-hook, which will permit the weight to drop and carry with it the free arm of the lever P, operating to lift the valve from its seat.

At R" is represented the upper portion of the float-stem, in this instance having its lower end fixed in the uprising central connection, $e'$, of the tubular connection of the float-stem by means of a set-screw. This upper portion of the float-stem extends upward into the steam-chest E, and is supported in its passage from the float-chamber to the steam-chest in a suitable tubular guide-bearing, $s$, to move vertically therein in a free manner. This vertical guide $s$ is provided with side openings at $s'$, to permit a free passage of the steam between the float-cylinder and the steam-chest. The upper end portion of this float-stem is constructed with a suitable slotted guideway, $s''$, to receive the free end of the trip-lever R' in a free manner, and the end portions of this guide-slot $s''$ in the vertical movements of the float serve as tappets to engage the free end of the trip-lever, and operate to disengage the hook-catch and permit the weighted end of the valve-lever to descend by the gravitation of the weight thereto attached, which action will lift the valve from its seat and permit a flow of steam to the alarm-whistle. In this construction and arrangement of the parts it will be seen that the rise or fall of the float, if sufficiently continued, will operate to admit steam to the alarm-whistle to give notice of high or low water in the boiler arising from any cause, such as the obstruction of the valves, a failure in the water-supply, or the derangement of any of the working parts employed in the automatic supply of water to the boiler.

At $s'''$ is represented a hook-arm formed on the upper end of the float-stem, projecting laterally therefrom, adapted to engage the upper edge of the valve-lever P, operating to utilize the weight of the descending float in connection with the weight R, connected with the lever P, to insure the disengagement of the alarm-valve from its seat if from any cause the weight R should be insufficient to open the valve.

At $t$ is represented a tappet-lever having a pivotal connection with the yoke of the valve-seat plug, from which pivotal connection it extends toward the float-stem, having its free end portion provided with a roller, $t'$, to engage the tappet-bar $t''$ on the float-stem when its free end is elevated. This lever $t$ is also provided near the center of its length at its rearward curving portion with a roller $t'''$, for a purpose to be described.

At T is represented a tubular stud-bearing, in this instance having a screw-thread connection with the rear side face of the steam-chest, from which it projects in a horizontal position, and its outer end is fitted in stuffing-box form.

At T' is represented a pendulum-lever having its journal-bearing portion $u$ supported to oscillate in the tubular stud-bearing, having a steam-tight connection therewith by means of the stuffing-box. The outer vertical arm, T', of this lever is provided at its lower end with a weight, T", for the purpose of holding it in a vertical position in a free manner. The inner end of the journal-arm $u$ of the pendulum-lever is provided with a depending tappet-arm, $u'$, fitted to engage the roller $t'''$ in the central portion of the tappet-lever $t$, and also to engage the enlarged portion $u''$ of the weighted lever P, connected with the alarm-valve. From this construction and arrangement of the parts it will be seen that if the weighted pendulum-lever is moved in the direction of its position indicated in the dotted lines at the left-hand side in Fig. 2 the tappet-arm $u'$ will engage the roller $t'''$ in the central portion of the tappet-lever $t$, and will lift the lever, causing the roller $t'$ in its free end to engage the tappet-bar $t''$ on the float-stem, and in its onward movement will lift the float, and by reason of its connection with the regulating valve $i$, as hereinbefore described, will operate to test its working, and also the working of either the steam or plunger pump; and the still further onward movement of the pendulum-lever in the same direction, by means of the trip-lever connection with the float-stem, will disengage the hook-catch and permit the weighted valve-lifting lever to descend and raise the alarm-valve from its seat for the purpose of testing its workings and the workings of the alarm-whistle.

In the movement of the pendulum-lever in the direction of its position indicated by the dotted lines at the right-hand side in Fig. 2 the tappet-arm $u'$ will engage the enlarged portion $u''$ on the weighted lever P, and its continued movement in the same direction will raise the weighted lever P, causing the catch-hook to engage the detent-hook $p'''$, to hold the lever in its elevated position, and permitting the valve to the alarm-whistle to drop to its seat and stop the alarm.

In the drawings at Fig. 12 is represented a modification in mechanical construction of some of the working parts of my improved regulating and alarm apparatus, in which the float-stem $w$ is produced in one piece, and the connection $w'$ is made adjustable thereon. The rock-shaft $w''$ has its jointed connection at its inner end portion, and the lever connection therewith at $w'''$ is hinge-jointed. The alarm-valve lever $x$ is produced in one piece, omitting the adjustability hereinbefore described. The detent-hook $x'$ has a hinge-joint support, and is provided with a depending guide-arm, which extends into an axial opening in the weight, operating as a guide to the movements of the parts. In all other respects the parts represented in this figure are substantially identical with like parts shown and hereinbefore described, and are designated by like letters of reference. In this instance the feed-water-regulating valve is placed on substantially the same plane with the float-cylinder; but some situations may require that it be placed on a lower level, which may be accomplished to any reasonable extent by inserting a suitable length of tubing in the screw-joint connection of the valve-tube, and employing a valve-rod of proper length.

Having thus fully described the construction and operation of my improved combined feed-water regulator and the safety high and low water alarm, I claim as my invention—

1. The combination, with the valve-tube provided with the valve or half-V-formed bearings, and with the rock-shaft provided with the beveled end, of the collar having its inner end beveled, for the purpose and substantially as described.

2. The combination, with the valve-tube provided with the valve or half-V-formed bearings, and with the rock-shaft provided with the beveled end, of the collar provided with the lever-arms for engaging valve-stem, substantially as and for the purpose set forth.

3. The combination, with the valve and with the float-cylinder, of a rock-shaft supported in the valve or half-V-formed bearings between the float-cylinder and its connection with the valve, and adapted to oscillate therein, substantially in the manner and for the purpose set forth.

4. The combination, with the alarm-valve, of a weighted lever to lift the valve from its seat and engage the catch-hook with the detent-hook, substantially as and for the purpose set forth.

5. The combination, with the catch-hook and detent-hook, of a trip-lever to disengage the catch-hook, substantially as and for the purpose set forth.

6. The combination, with the float-stem extending into the steam-chest, of a catch-hook, detent-hook, and a trip-lever operated by the upward or downward movement of the float controlled by the rise and fall of the water in the boiler to disengage the catch-hook, substantially as and for the purpose set forth.

7. The combination, with the weighted lever to lift the alarm-valve, of a float-stem adapted to engage the valve-lever by means of the hook, substantially as and for the purpose set forth.

8. The combination, with the weighted valve-lifting lever, of a catch-hook to engage a detent to hold the lever disengaged from the valve, substantially as and for the purpose set forth.

9. The combination, with the float-stem, of a test-lever and an intermediate tappet-lever to test the regulating-valve, the steam or plunger pumps, and the alarm valve and whistle, or either of them, substantially as hereinbefore set forth.

10. The combination, with the valve-lifting weighted lever, of a lifting-lever to lift the weighted lever to cause the catch-hook to engage the detent-hook, substantially as and for the purpose set forth.

11. The combination, with the delivery end portion of the water-supply pipe to the boiler, of the receiving end portion of the water-supply pipe to the regulator, said receiving end of the regulator supply-pipe supported in the axial center of the delivery end of the boiler-supply pipe, substantially as and for the purpose set forth.

EDWARD D. SHEPARDSON.

Witnesses:
J. B. HIGBEE,
T. W. WARD.